US008634161B2

(12) United States Patent
Hsiao et al.

(10) Patent No.: US 8,634,161 B2
(45) Date of Patent: Jan. 21, 2014

(54) SYSTEMS HAVING WRITER WITH DEEPER WRAP AROUND SHIELD AND METHODS FOR MAKING THE SAME

(75) Inventors: Wen-Chien D. Hsiao, San Jose, CA (US); Aron Pentek, San Jose, CA (US); Thomas J. A. Roucoux, San Jose, CA (US)

(73) Assignee: HGST Netherlands, B.V., Amsterdam (NL)

( * ) Notice: Subject to any disclaimer, the term of this patent is extended or adjusted under 35 U.S.C. 154(b) by 83 days.

(21) Appl. No.: 12/975,157

(22) Filed: Dec. 21, 2010

(65) Prior Publication Data

US 2011/0096434 A1    Apr. 28, 2011

Related U.S. Application Data

(63) Continuation-in-part of application No. 12/347,058, filed on Dec. 31, 2008.

(51) Int. Cl.
*G11B 5/23* (2006.01)

(52) U.S. Cl.
USPC ............. 360/119.02; 360/119.03; 360/119.04

(58) Field of Classification Search
USPC .............. 360/119.02–119.04, 125.02–125.03
See application file for complete search history.

(56) References Cited

U.S. PATENT DOCUMENTS

| | | | |
|---|---|---|---|
| 6,751,846 B2 * | 6/2004 | Hashimoto et al. | ........ 29/603.14 |
| 7,061,717 B2 | 6/2006 | Takano | |
| 7,203,032 B2 | 4/2007 | Kimura et al. | |
| 7,239,480 B2 | 7/2007 | Hirabayashi et al. | |
| 7,248,431 B1 | 7/2007 | Liu et al. | |
| 7,467,461 B2 * | 12/2008 | Bonhote et al. | ............ 29/603.16 |
| 7,639,450 B2 * | 12/2009 | Hsu et al. | ................. 360/125.02 |
| 7,715,147 B2 | 5/2010 | Feldbaum et al. | |
| 7,877,859 B2 | 2/2011 | Hsiao et al. | |

(Continued)

FOREIGN PATENT DOCUMENTS

| | | |
|---|---|---|
| JP | 2002-305336 | 10/2002 |
| JP | 2005-209244 A | 8/2005 |

(Continued)

OTHER PUBLICATIONS

Non-Final Office Action Summary from U.S. Appl. No. 12/347,058 dated Nov. 1, 2011.

(Continued)

*Primary Examiner* — Will J Klimowicz
*Assistant Examiner* — Carlos E Garcia
(74) *Attorney, Agent, or Firm* — Zilka-Kotab, PC

(57) ABSTRACT

A method according to one embodiment includes etching an underlayer positioned under a main pole for reducing a thickness thereof and creating an undercut under the main pole; adding a gap material along sides of the main pole and in the undercut; and forming a shield along at least a portion of the gap material. A magnetic head according to one embodiment includes a main pole; an underlayer positioned under the main pole and spaced therefrom, thereby defining an undercut therebetween; a first layer of gap material extending along sides of the main pole and in the undercut; a second layer of gap material extending continuously along the underlayer under the main pole; and a shield encircling the main pole, wherein the shield extends between the first and second layers of gap material in the undercut. Additional systems and methods are also presented.

12 Claims, 10 Drawing Sheets

(56) References Cited

U.S. PATENT DOCUMENTS

| | | |
|---|---|---|
| 8,031,433 B2 | 10/2011 | Yan et al. |
| 8,149,537 B2 * | 4/2012 | Nazarov ............... 360/125.3 |
| 8,233,237 B2 * | 7/2012 | Anagawa et al. ......... 360/125.3 |
| 8,259,413 B2 | 9/2012 | Bonhote et al. |
| 2004/0233577 A1 | 11/2004 | Takano |
| 2005/0219750 A1 | 10/2005 | Matono et al. |
| 2006/0044682 A1 * | 3/2006 | Le et al. ............... 360/126 |
| 2006/0245108 A1 * | 11/2006 | Hsu et al. ............... 360/125 |
| 2007/0146929 A1 * | 6/2007 | Maruyama et al. ......... 360/125 |
| 2007/0146931 A1 | 6/2007 | Baer et al. |
| 2008/0088972 A1 * | 4/2008 | Sasaki et al. ............. 360/110 |
| 2008/0278855 A1 | 11/2008 | Guthrie et al. |
| 2008/0297952 A1 | 12/2008 | Kameda et al. |
| 2009/0117407 A1 | 5/2009 | Zheng et al. |
| 2009/0154009 A1 | 6/2009 | Le |
| 2009/0154013 A1 | 6/2009 | Sugiyama et al. |
| 2009/0154021 A1 | 6/2009 | Nunokawa et al. |
| 2009/0168236 A1 * | 7/2009 | Jiang et al. ............. 360/110 |
| 2009/0168237 A1 | 7/2009 | Hsiao et al. |
| 2009/0168257 A1 | 7/2009 | Hsiao et al. |
| 2009/0195920 A1 | 8/2009 | Bonhote et al. |
| 2010/0165513 A1 * | 7/2010 | Bonhote et al. .............. 360/244 |
| 2011/0090595 A1 * | 4/2011 | Hirata et al. ............. 360/125.03 |
| 2011/0096434 A1 | 4/2011 | Hsiao et al. |

FOREIGN PATENT DOCUMENTS

| | | |
|---|---|---|
| JP | 2006-073058 A | 3/2006 |
| JP | 2009-087474 | 4/2009 |
| JP | 2010-12900 | 6/2010 |
| JP | 2010-129100 A | 6/2010 |
| WO | 2009-147729 A1 | 12/2009 |

OTHER PUBLICATIONS

Restriction Requirement from U.S. Appl. No. 12/347,058 dated Jul. 29, 2011.

Notice of Allowance and Fee(s) Due from U.S. Appl. No. 12/347,058 dated May 3, 2012.

* cited by examiner

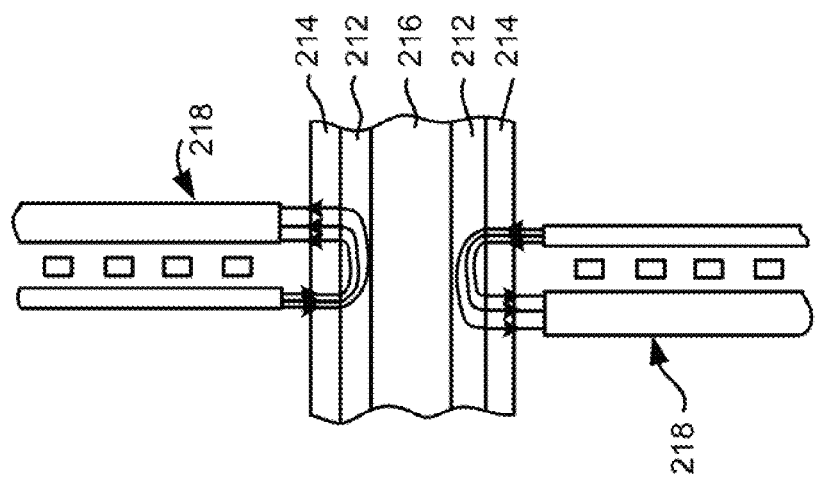
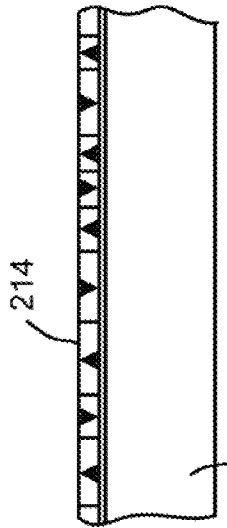
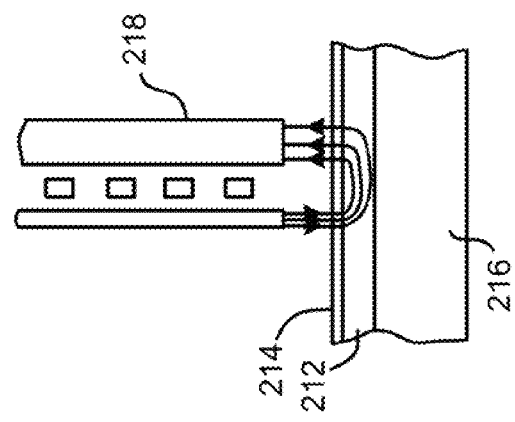
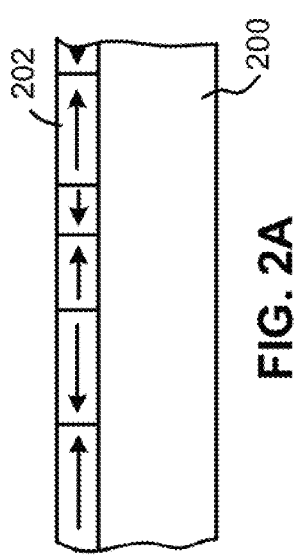
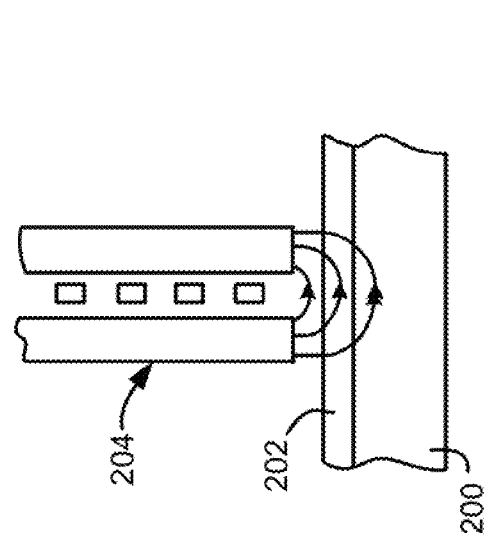

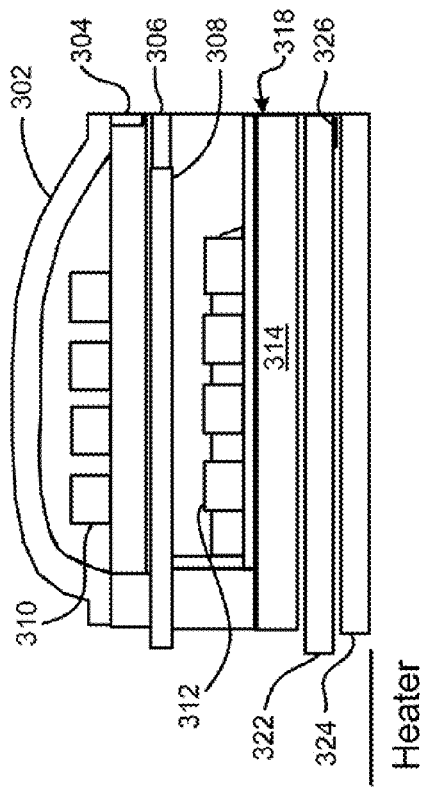
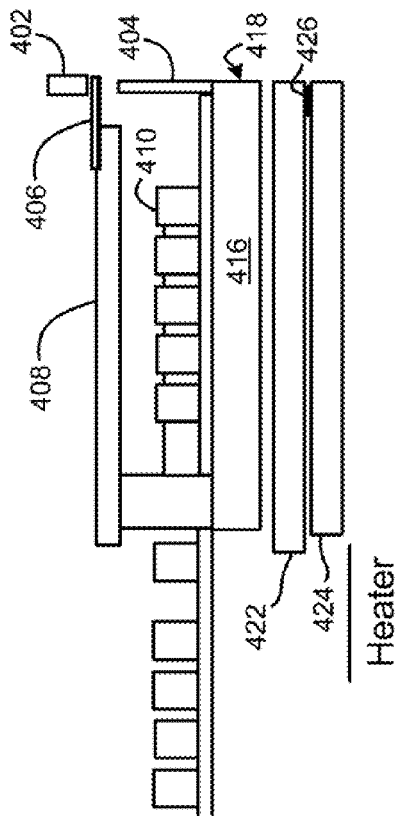
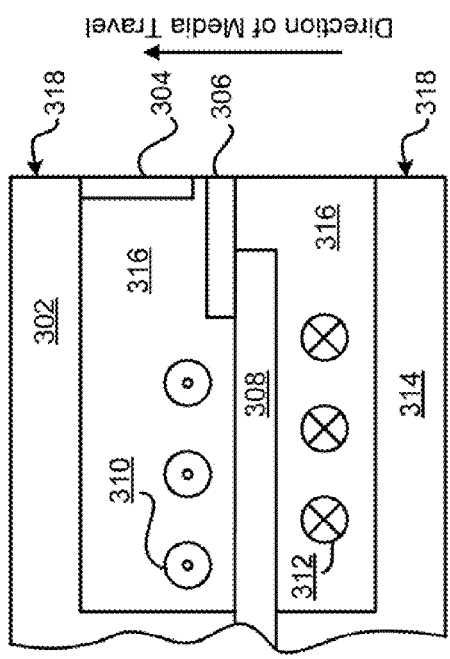
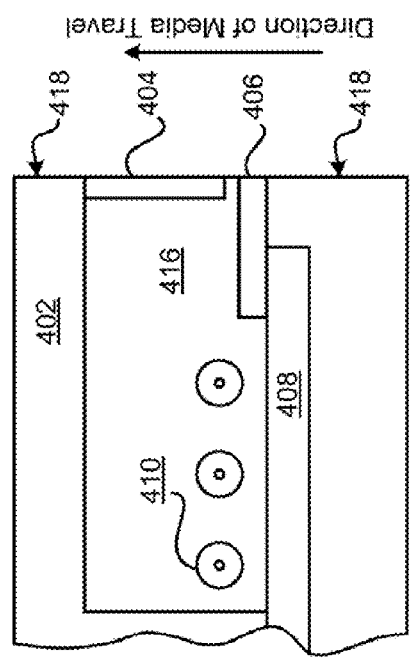

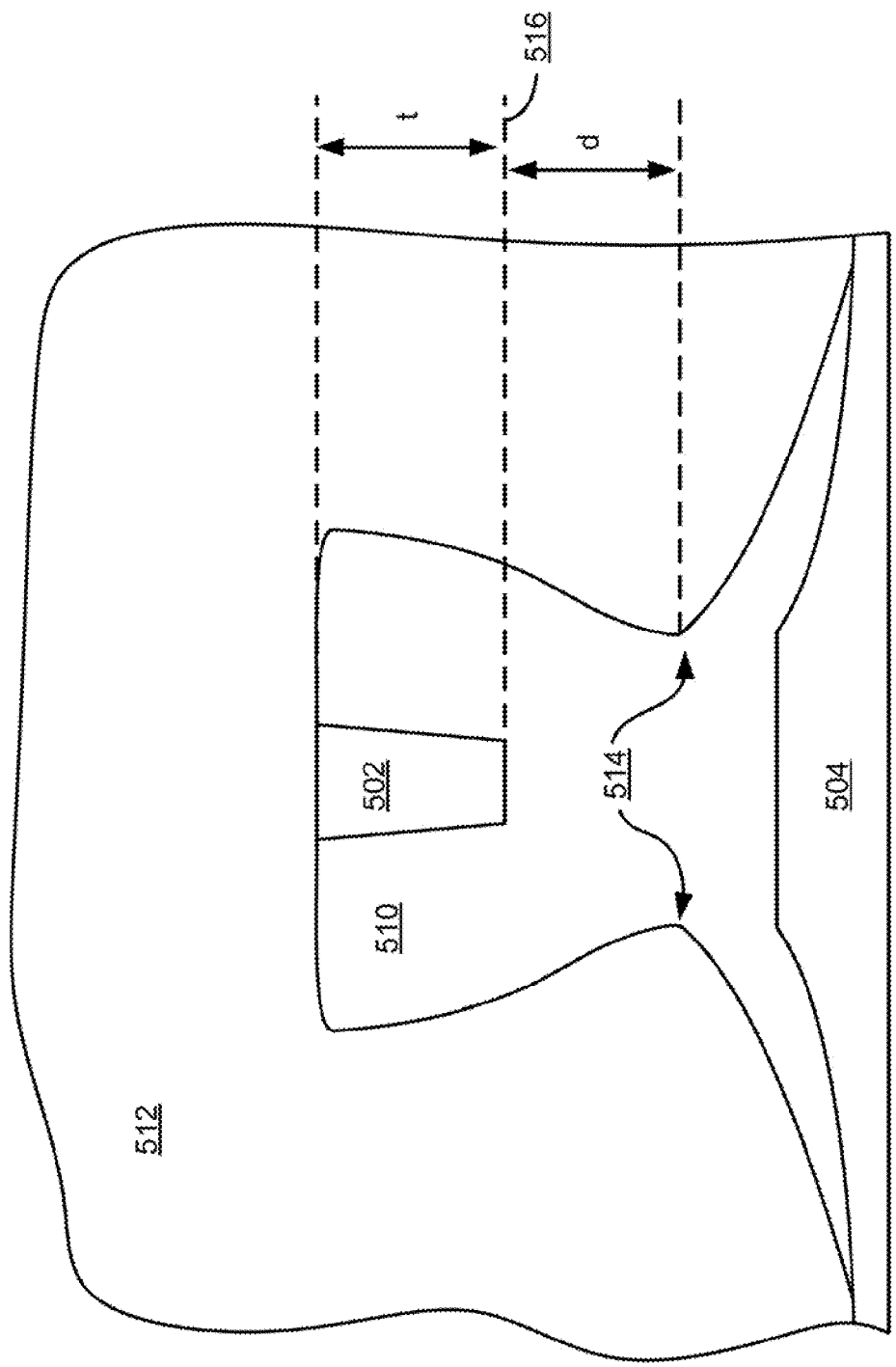

SYSTEMS HAVING WRITER WITH DEEPER WRAP AROUND SHIELD AND METHODS FOR MAKING THE SAME

RELATED APPLICATIONS

This application is continuation-in-part of U.S. patent application Ser. No. 12/347,058 filed Dec. 31, 2008, from which priority is claimed and which is herein incorporated by reference.

FIELD OF THE INVENTION

The present invention relates to data storage systems, and more particularly, this invention relates to systems having deeper wrap around shield and methods for making the same.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, HDDs have been desired to store more information in its limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. For example, as writer dimensions shrink, problems of adjacent track interference (ATI) become more prevalent. Thus, what is needed is a way to minimize ATI.

SUMMARY OF THE INVENTION

A method according to one embodiment includes etching an underlayer positioned under a main pole for reducing a thickness thereof and creating an undercut under the main pole; adding a gap material along sides of the main pole and in the undercut; and forming a shield along at least a portion of the gap material.

A magnetic head according to one embodiment includes a main pole; an underlayer positioned under the main pole and spaced therefrom, thereby defining an undercut therebetween; a first layer of gap material extending along sides of the main pole and in the undercut; a second layer of gap material extending continuously along the underlayer under the main pole; and a shield encircling the main pole, wherein the shield extends between the first and second layers of gap material in the undercut.

A magnetic head according to one embodiment includes a main pole; an underlayer positioned under the main pole and spaced therefrom, thereby defining an undercut therebetween; a first layer of gap material extending along sides of the main pole and in the undercut; a second layer of gap material extending along the underlayer and joining the first layer in the undercut; and a shield, wherein the shield extends along a top and lateral sides of the main pole but does not encircle the main pole, wherein corners of the shield located under a plane of deposition of the main pole extending along a bottom of the main pole are located a vertical distance from the plane that is between about ½ a deposition thickness of the main pole and the deposition thickness of the main pole.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

FIGS. 5A-F are partial cross sectional views depicting processes for forming a magnetic head.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a method includes etching an underlayer positioned under a main pole for reducing a thickness thereof and creating an undercut under the main pole; adding a gap material along sides of the main pole and in the undercut; and forming a shield along at least a portion of the gap material.

In another general embodiment, a magnetic head includes a main pole; an underlayer positioned under the main pole and spaced therefrom, thereby defining an undercut therebetween; a first layer of gap material extending along sides of the main pole and in the undercut; a second layer of gap material extending continuously along the underlayer under the main pole; and a shield encircling the main pole, wherein the shield extends between the first and second layers of gap material in the undercut.

In yet another general embodiment, a magnetic head includes a main pole; an underlayer positioned under the main pole and spaced therefrom, thereby defining an undercut therebetween; a first layer of gap material extending along sides of the main pole and in the undercut; a second layer of gap material extending along the underlayer and joining the first layer in the undercut; and a shield, wherein the shield extends along a top and lateral sides of the main pole but does not encircle the main pole, wherein corners of the shield located under a plane of deposition of the main pole extending along a bottom of the main pole are located a vertical distance from the plane that is between about ½ a deposition thickness of the main pole and the deposition thickness of the main pole.

Figure 1:
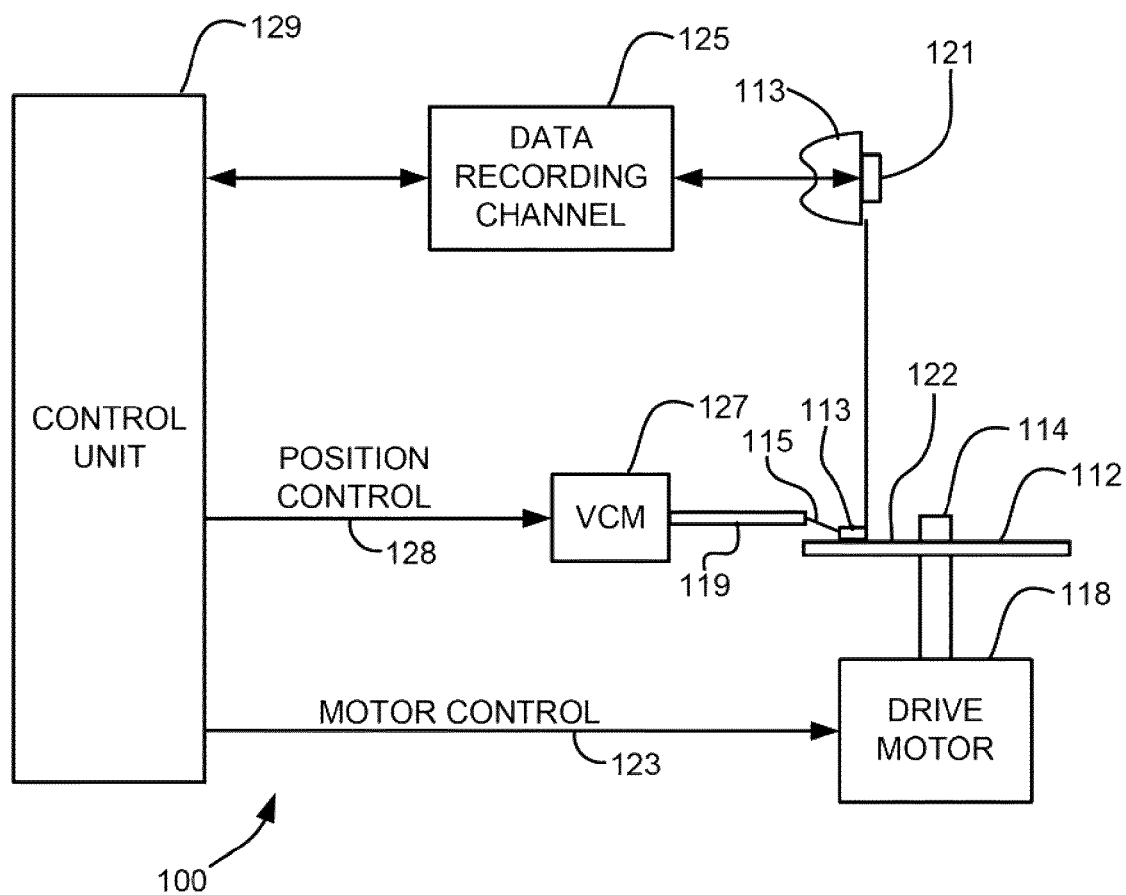
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and May provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410 and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

U.S. patent application Ser. No. 12/347,058, which has been incorporated by reference, describes various embodiments and fabrication techniques which are compatible with the embodiments described herein and permutations thereof. However, the various embodiments described herein and permutations thereof are also usable with other pole designs and techniques of types known in the art, and therefore the following description should be viewed as exemplary rather than limiting.

FIGS. 5A-F illustrate methods for fabricating a magnetic head according to one embodiment. The drawings are not to scale. The method may be carried out in conjunction with or for use in any desired environment, including those shown in FIGS. 1-4B, according to various embodiments. The method may include more or less operations than are shown in FIG. 5, as would be apparent to one of skill in the art upon reading the present descriptions.

Figure 5A:
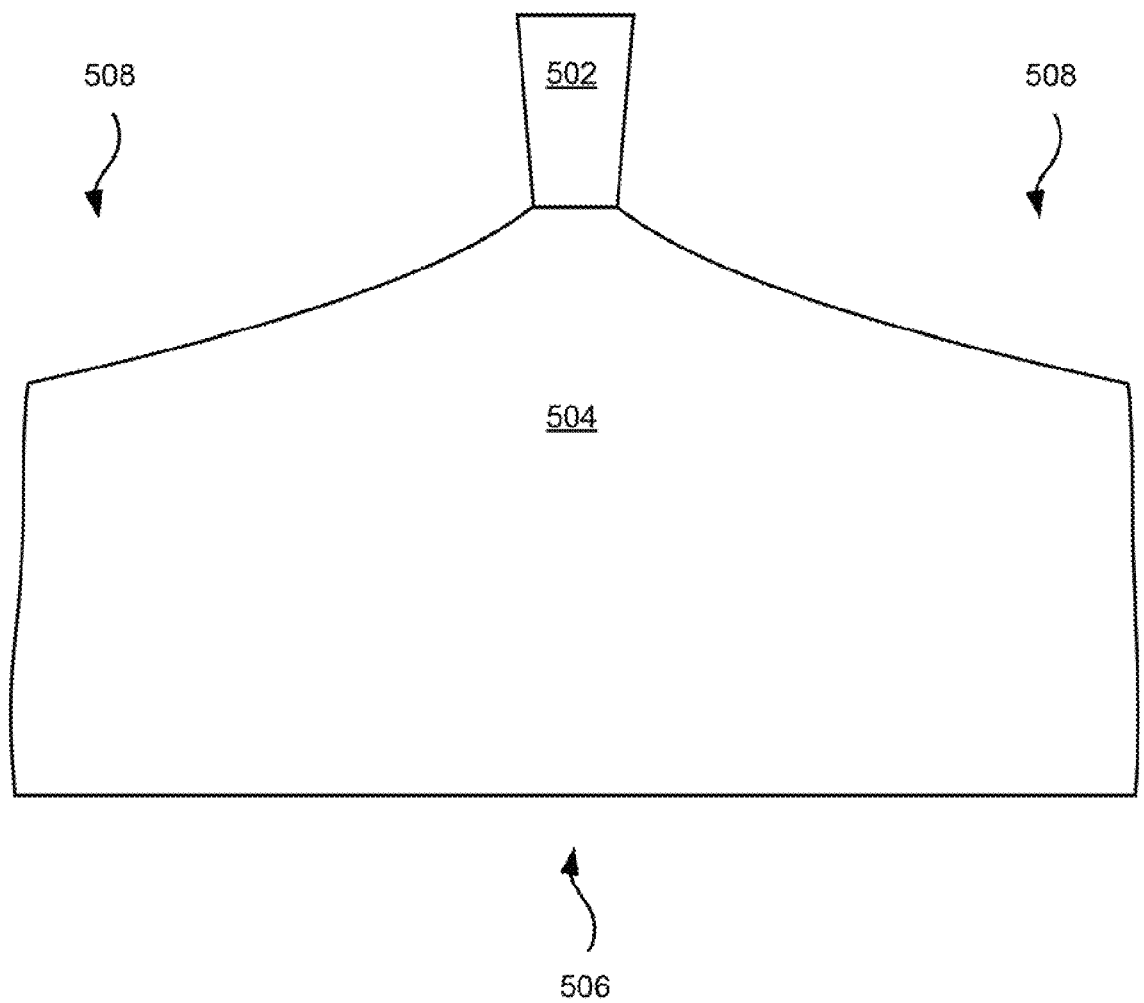

As shown in FIG. 5A, a main pole 502 is formed above an underlayer 504. The main pole 502 may have been shaped using any known method, such as masking and milling. In particularly preferred embodiments, the shaping causes the underlayer to have a tapered thickness that is thicker in a region 506 under the main pole 502 and decreases in regions 508 away from the main pole 502.

Figure 5B:
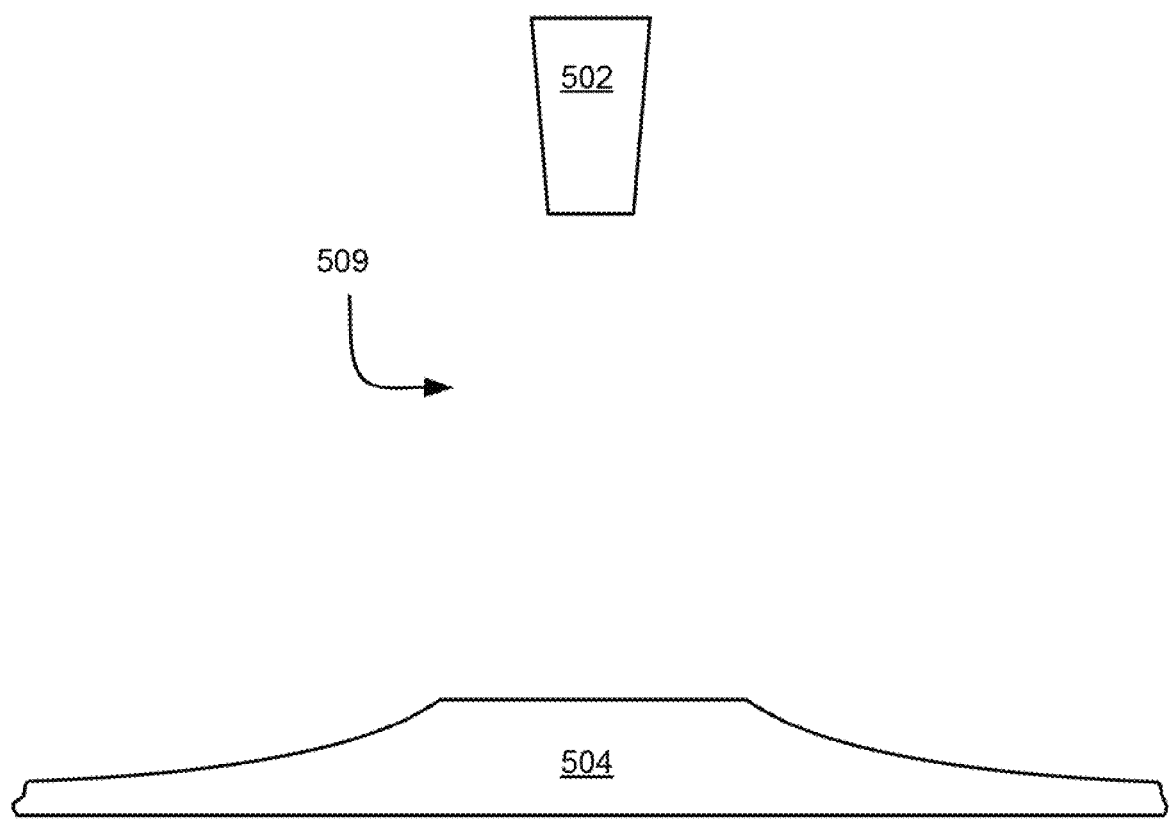

Referring to FIG. 5B, the underlayer 504 is etched for reducing a thickness thereof and creating an undercut 509 under the main pole 502. As shown, the etching further reduces the thickness of the underlayer 504 and causes the underlayer 504 to still have a tapered thickness that is thicker under the main pole 502 and decreases away from the main pole 502. Generally, the amount of underlayer 504 removed by the etching corresponds to the etch rate of the etchant at processing conditions, so the actual shape of the upper surface may have substantially the same shape, but may have physical characteristics of being etched, e.g., in a wet process using an etchant. Such characteristics may include a smoother surface than the layer had after the milling that shaped the main pole 502, rounded corners (e.g., near the undercut), etc.

Where the underlayer 504 is alumina, an alumina etchant of a type known in the art may be used. One illustrative alumina etchant is tetramethylammonium hydroxide (TMAH). Resist developers of a type know in the art to etch alumina may also be used. Preferably, the etching is a wet process.

Figure 5C:
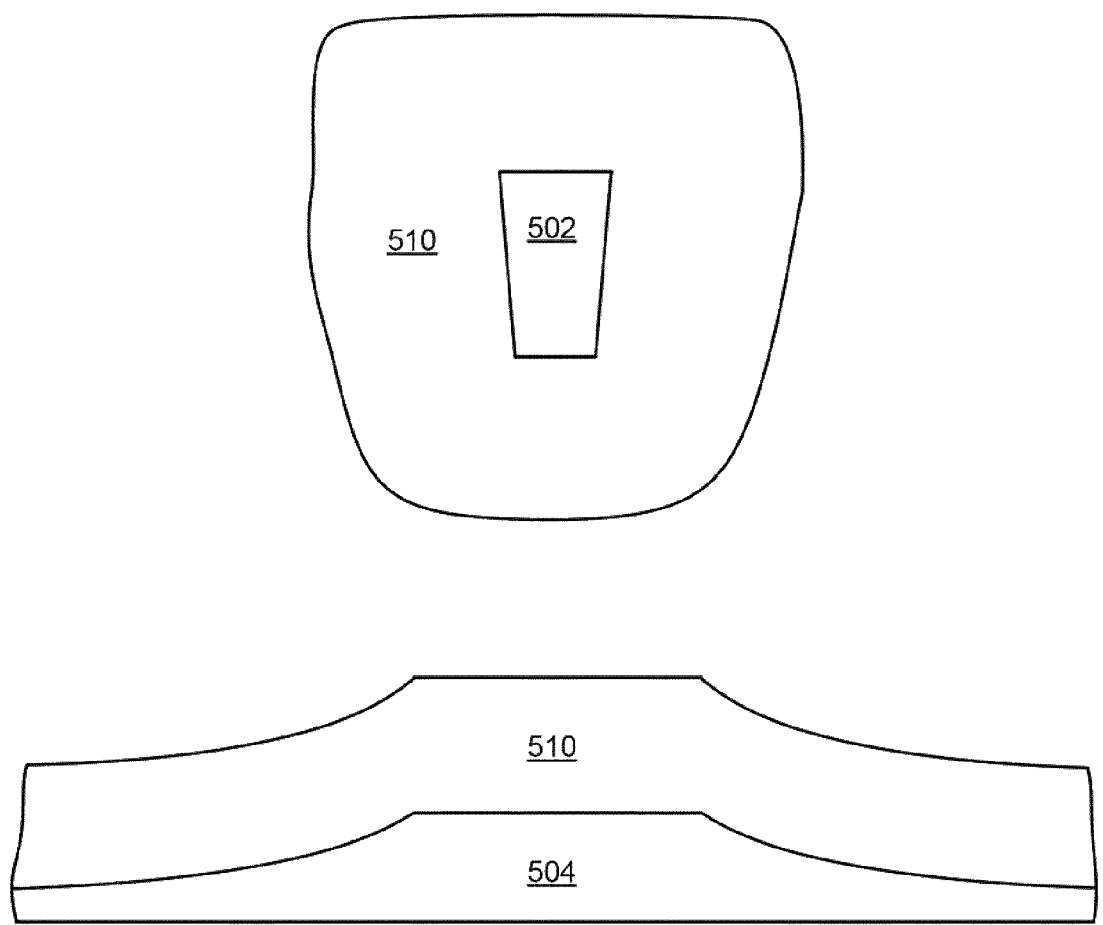

Referring to FIG. 5C, a gap material 510 is added along sides of the main pole 502 and in the undercut. The gap material 510 is also formed as a layer on the underlayer 504, where the layer of gap material 510 on the underlayer 504 has about a constant deposition thickness therealong. Thus, an upper surface of the gap material 510 will typically be shaped like an upper surface of the underlayer 504 where a conformal deposition process such as atomic layer deposition (ALD) is used to deposit the gap material 510. Any suitable nonmagnetic gap material 510 may be used, alumina being preferred.

In particularly preferred embodiments, the gap material 510 is formed after the etching preferably before any further additive processes, and ideally without any intervening processes, except those associated with removing the etchant used for the etching (e.g., by spinning the etchant off). This ensures that the integrity of the main pole 502 is not compromised. Particularly, the main pole 502 is under stress. When the undercut is formed, the main pole 502 tends to want to relieve the stress by deforming. By adding the gap material 510 soon after the etching, the integrity of the main pole 502 can be maintained.

Figure 5D:
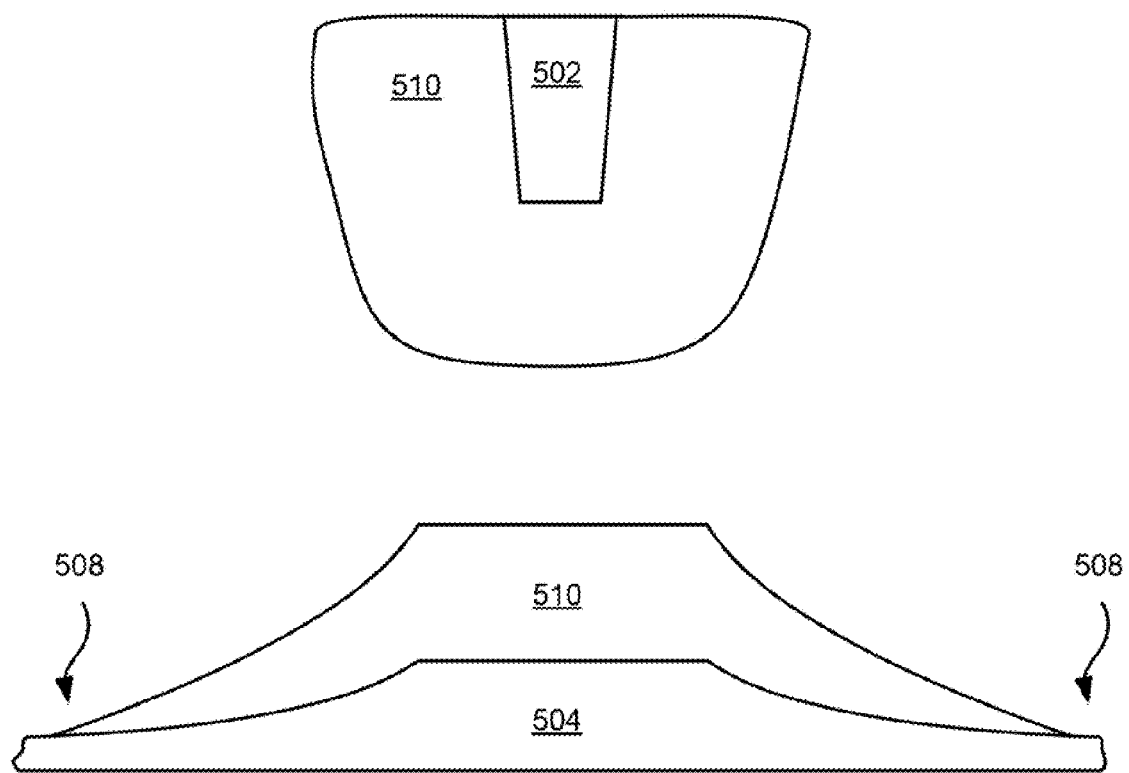

A subtractive process such as ion milling may be performed to remove the material overlying the main pole 502, as shown in FIG. 5D. After the subtractive process, the layer of gap material 510 lying over the underlayer 504 may also be removed in the regions 508 away from the main pole 502, while some gap material 510 remains under the main pole 502 due to the shadowing thereof by the main pole 502. Thus, a thickness of the layer of gap material 510 above the underlayer 504 tapers together therealong in a direction away from the main pole 502, coming to a point and disappearing completely in each of the regions 508 away from the main pole 502.

Figure 5E:
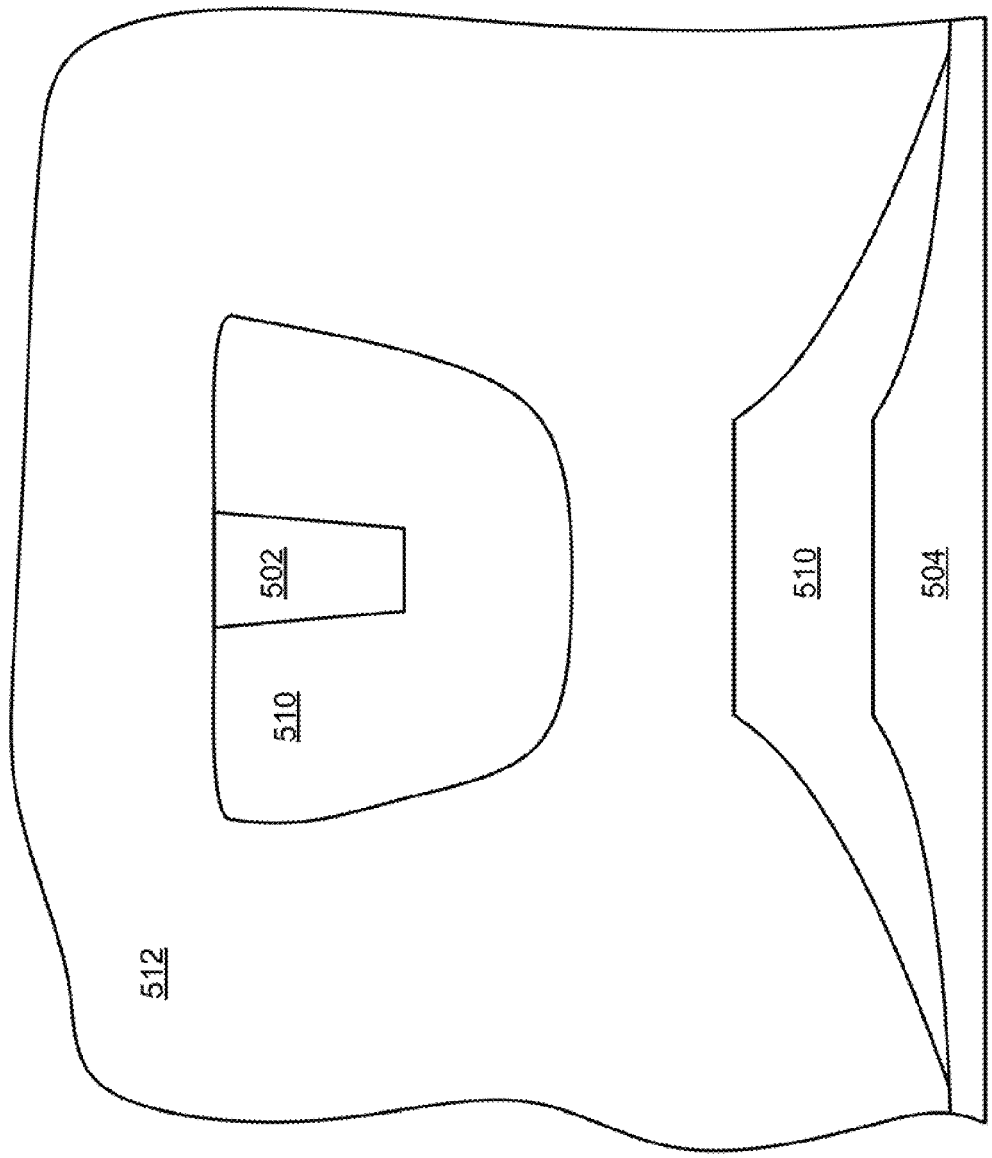

Referring to FIG. 5E, a shield 512 is formed along at least a portion of the gap material 510. In this embodiment, the shield encircles the main pole 502, extending through the undercut between the layer of gap material 510 on the underlayer 504 and the gap material 510 nearest the main pole 502. The shield may be formed in any known manner. In one preferred approach a nonmagnetic seed layer, e.g., of Cr, Ru, etc. is applied, e.g., by sputtering and/or plasma vapor deposition (PVD). The shield may then be plated onto the seed layer.

FIG. 5F depicts an alternate embodiment where less etching is performed than in the embodiment shown in FIG. 5B. In FIG. 5F, the gap material 510 fills in some or all of the undercut. The shield thus extends along the top and lateral sides of the main pole 502 but does not encircle the main pole 502. Corners 514 of the shield located under a plane of deposition 516 of the main pole 502 extending along a bottom of the main pole 502 are located a vertical distance d from the plane 516 that is between about ½ a deposition thickness t of the main pole 502 and the deposition thickness of the main pole 502.

Figure 6:
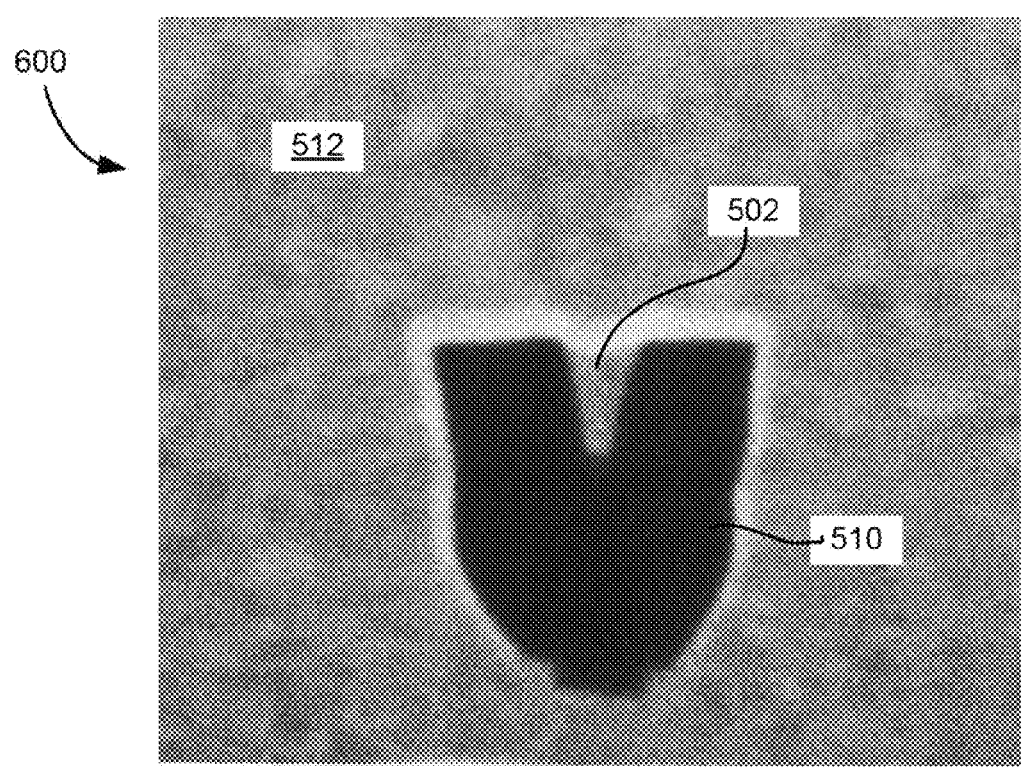
FIG. 6 is a partial cross sectional view of a head resulting from the method of FIGS. 5A-5E.

FIG. 6 is a partial cross sectional view of a head 600 resulting from the method of FIGS. 5A-5E.

Figure 7:
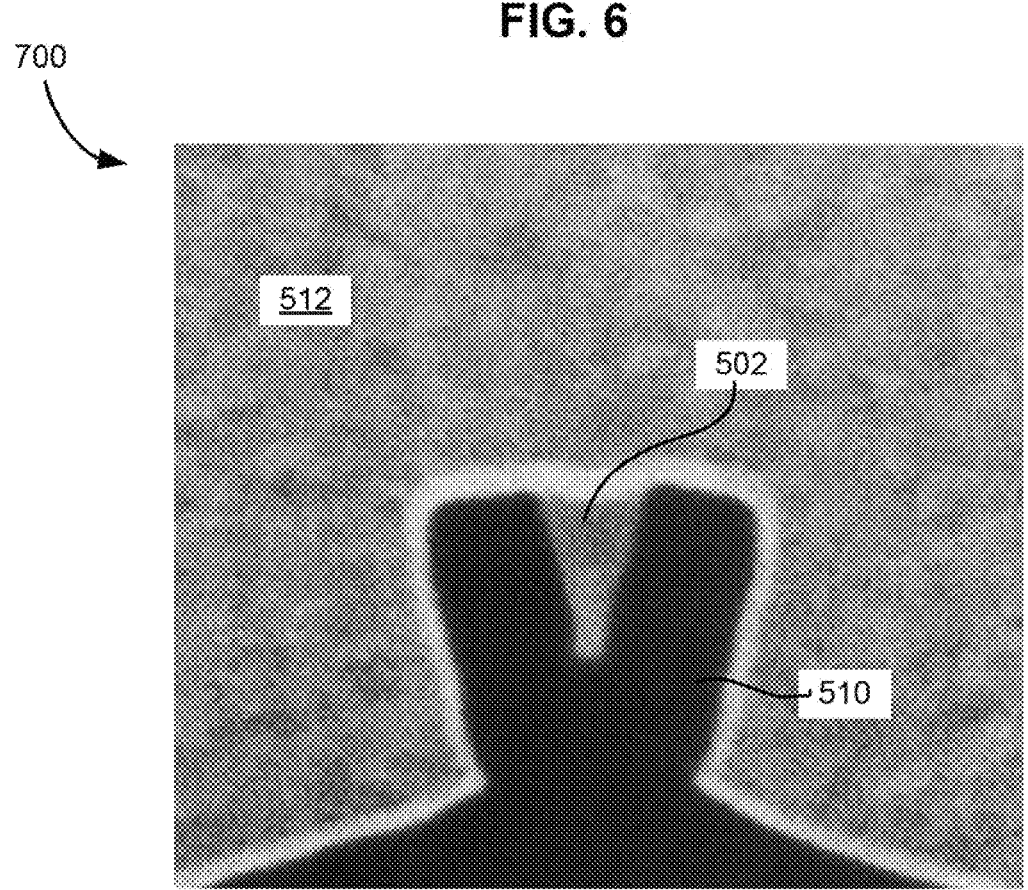
FIG. 7 is a partial cross sectional view of a head resulting from the method of FIGS. 5A-5D and 5F.

FIG. 7 is a partial cross sectional view of a head 700 resulting from the method of FIGS. 5A-5D and 5F.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
    forming a main pole;
    forming an underlayer;
    etching the underlayer for reducing a thickness thereof and creating the undercut under the main pole;
    the underlayer being positioned under the main pole and spaced therefrom, thereby defining an undercut therebetween;
    forming a first layer of gap material extending along sides of the main pole and in the undercut;
    forming a second layer of gap material extending continuously along the underlayer under the main pole; and
    forming a shield encircling the main pole, wherein the shield extends between the first and second layers of gap material in the undercut,
    wherein the underlayer has a tapered thickness that is thicker under the main pole and decreases away from the main pole.

2. The method of claim 1, further comprising shaping the main pole, wherein the shaping causes the underlayer to have a tapered thickness that is thicker under the main pole and decreases away from the main pole, wherein the etching further reduces the thickness of the underlayer and causes the underlayer to have a tapered thickness that is thicker under the main pole and decreases away from the main pole.

3. The method of claim 2, wherein the gap material is also formed as a layer on the underlayer, wherein a thickness of the layer of gap material on the underlayer tapers together therealong in a direction away from the main pole.

4. The method of claim 1, wherein the shield encircles the main pole.

5. The method of claim 4, wherein the gap material is also formed as a layer on the underlayer, wherein the shield in the undercut extends between the layer of gap material on the underlayer and the gap material nearest the main pole.

6. The method of claim 1, wherein the shield extends along a top and lateral sides of the main pole but does not encircle the main pole, wherein corners of the shield located under a plane of deposition of the main pole extending along a bottom of the main pole are located a vertical distance from the plane that is between about ½ a deposition thickness of the main pole and the deposition thickness of the main pole.

7. The method of claim 1, wherein the underlayer comprises alumina, wherein the underlayer is etched in a wet process using an alumina etchant.

8. The method of claim 1, wherein the gap material is formed after the etching without any intervening processes except those associated with removing an etchant used for the etching.

9. A magnetic head, comprising:
    a main pole;
    an underlayer positioned under the main pole and spaced therefrom, thereby defining an undercut therebetween;
    a first layer of gap material extending along sides of the main pole and in the undercut;
    a second layer of gap material extending continuously along the underlayer under the main pole; and
    a shield encircling the main pole, wherein the shield extends between the first and second layers of gap material in the undercut,
    wherein the underlayer has a tapered thickness that is thicker under the main pole and decreases away from the main pole.

10. The magnetic head of claim 9, wherein the underlayer comprises alumina, wherein the underlayer has an upper surface having physical characteristics of being etched in a wet process using an alumina etchant.

11. The magnetic head of claim 9, wherein a thickness of the second layer of gap material tapers together therealong in a direction away from the main pole.

12. A magnetic data storage system, comprising:
    at least one magnetic head as recited in claim 9;
    a magnetic medium;
    a drive mechanism for passing the magnetic medium over the at least one magnetic head; and a controller electrically coupled to the at least one magnetic head for controlling operation of the at least one magnetic head.

\* \* \* \* \*